(12) United States Patent
Deptolla

(10) Patent No.: US 6,659,557 B2
(45) Date of Patent: Dec. 9, 2003

(54) ARTICULATED FITTING FOR AUTOMOBILE SEATS

(75) Inventor: Bernd Deptolla, Niedernwöhren (DE)

(73) Assignee: Faurecia Autositze GmbH & Co. KG (DE)

( * ) Notice: Subject to any disclaimer, the term of this patent is extended or adjusted under 35 U.S.C. 154(b) by 0 days.

(21) Appl. No.: 10/075,923

(22) Filed: Feb. 13, 2002

(65) Prior Publication Data
US 2002/0113479 A1 Aug. 22, 2002

(30) Foreign Application Priority Data
Feb. 16, 2001 (DE) .......................... 101 07 237

(51) Int. Cl.7 .................................................. B60N 2/02
(52) U.S. Cl. .................... 297/367; 297/378.12
(58) Field of Search ........................... 297/367, 378.12

(56) References Cited

U.S. PATENT DOCUMENTS

| | | | | |
|---|---|---|---|---|
| 3,953,069 A | * | 4/1976 | Tamura et al. | 297/367 |
| 3,957,312 A | * | 5/1976 | Bonnaud | 297/341 |
| 4,295,682 A | * | 10/1981 | Kluting et al. | 297/367 |
| 4,913,494 A | * | 4/1990 | Ikegaya | 297/367 |
| 5,788,330 A | * | 8/1998 | Ryan | 297/378.12 |
| 6,120,098 A | * | 9/2000 | Magyar et al. | 297/367 |
| 6,336,679 B1 | * | 1/2002 | Smuk | 297/378.12 |
| 6,402,249 B1 | * | 6/2002 | Rohee et al. | 297/367 |

FOREIGN PATENT DOCUMENTS

DE 10031640 1/2001

* cited by examiner

Primary Examiner—Peter M. Cuomo
Assistant Examiner—Sarah C. Burnham
(74) Attorney, Agent, or Firm—Bourque & Associates, P.A.

(57) ABSTRACT

An inclination adjustment fitting for adjusting the inclination of a seat back relative to a seat body and tilting the seat into a release position includes a first and a second actuation element mounted about an actuation shaft, an opposing element secured to the seat back, a ratcheting disk mounted to the seat back and including a plurality of engaging teeth, and a ratcheting block mounted to the seat back and including an engaging surface. The seat inclination is adjusted by pivoting the first actuation element, thereby releasing the engaging teeth from the engaging surface and pivoting the second actuation element and allowing the ratcheting disk to rotate. The seat is tilted to the release position by pivoting the second actuation element wherein the first actuation element remains in its initial position and the ratcheting disk is secured against the seat body by means of the ratcheting block.

7 Claims, 5 Drawing Sheets

ARTICULATED FITTING FOR AUTOMOBILE SEATS

TECHNICAL FIELD

The invention relates to tilting seats and more particularly, to an articulated fitting for a tilting seat which allows seat back inclination to be pre-set while allowing an adjustment mechanism to pivot the seat back and return it to the previous inclination position.

BACKGROUND INFORMATION

Along with an inclination adjustment fitting, an articulated fitting of the known type disclosed, for example, in DE 100 31 640 A1 includes a memory mechanism for the position of seat back inclination consisting of a ratcheting disk and a ratcheting block, as well as an additional pawl that blocks the ratcheting disk. Such fittings offer the advantage that automobile seats possessing only a seat back inclination adjustment, and a seat back inclination adjustment coupled with a forward-tilt option, which the front seats of two door vehicles require, may be equipped with the same inclination adjustment fittings. Such front seats merely require an additional memory mechanism to store the inclination adjustment value. The known solution is expensive because it includes numerous individual moving parts.

SUMMARY

The present invention provides a seat back inclination that is determined by fittings that require no active actuation when the seat back is tilted forward. Since seat back inclination adjustments occur, as a rule, less frequently than a forward tilting of the seat back, the invention reduces the wear to the elements that secure the seat back in its various inclination positions.

Accordingly, the present invention features an articulated fitting for seats with adjustable seat back inclination that is free to pivot about the same horizontal axis for backward inclination adjustment as well as for forward tilt into a release position which includes an inclination adjustment fitting by means of which the desired inclination may be fixed and released by means of a first actuation element for free swiveling about the pivot axis. The articulated fitting further includes a ratcheting disk that may be fixed in a swivel position by means of a ratcheting block, and a strike surface for an opposing element.

A second actuation element is provided to release the inclination adjustment fitting to allow the seat back to tilt forward. The first actuation element is formed so that it might displace the ratcheting block located in the seat body into, and out of, engagement with the ratcheting disk. The second actuation element is coupled with the first actuation element that leaves a specified displacement area, whereby the opposing element is fixed so that it cannot tilt, and so that the strike surface is pre-tensioned toward the opposing element by a spring.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Although the present invention will be explained with regard to an automobile seat, this is not a limitation of the present invention as the articulated fitting may be utilized in various situations all within the scope of the present invention.

Figure 4:
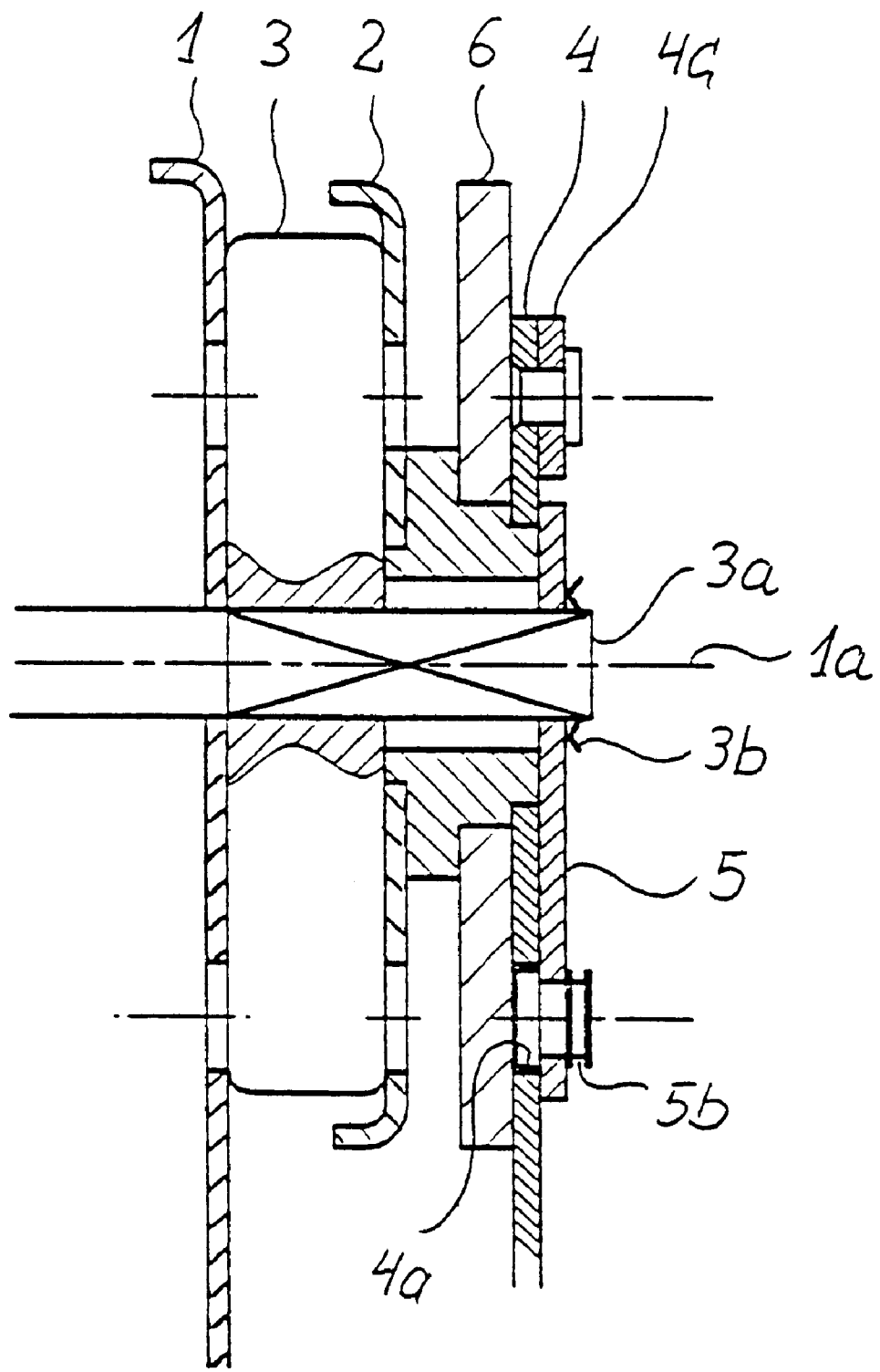
FIG. 4 is a view along projection IV—IV in FIG. 3.

A seat back 2 is mounted on a seat body 1 of an automobile seat so that it may swivel about a pivot axis 1a. The seat back 2 may be fixed at a given inclination with respect to the seat body 1 by means of an inclination adjustment fitting 3 shaped as a round-plate ratcheting fitting. The round-plate ratcheting fitting is of a known design, and is therefore shown only in FIG. 4 as an outline between the side supports of the seat body 1 and the seat back 2. An inclination adjustment fitting 3 is provided on each side of the automobile seat. The two inclination adjustment fittings 3 are inter-connected via an actuation shaft 3a that does not allow rotation.

A first actuation element 4 mounted free to rotate concentrically with the actuation shaft 3a is connected through a joint and via a shackle 4c with a ratcheting block 7 formed as a ratcheting lever bent about the pivot axis 1a. The ratcheting block 7 is mounted to the seat body 1 so that it is free to pivot.

Figure 1:
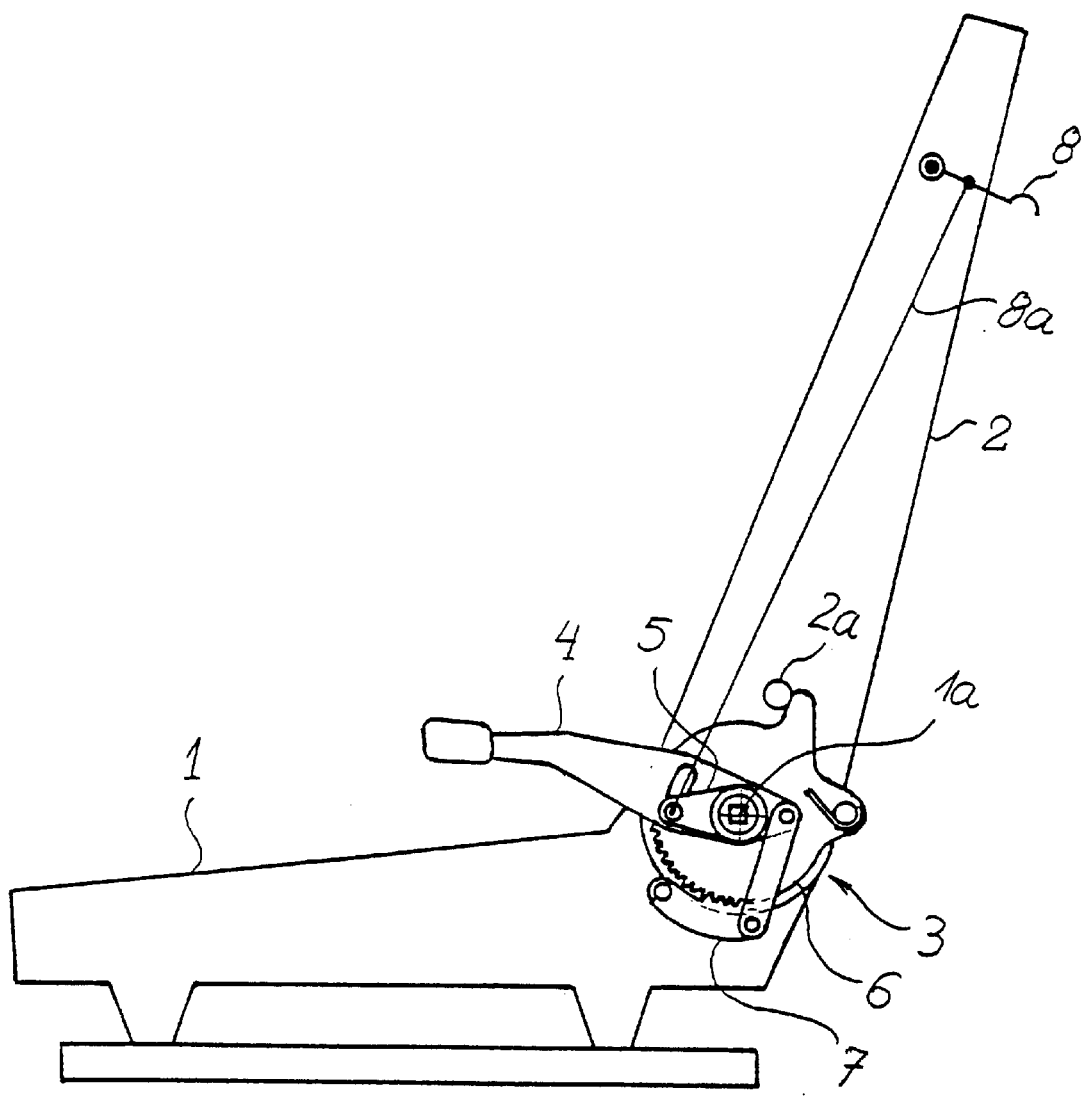
FIG. 1 is a schematic side view of an automobile seat with a seat back capable of being tilted forward via an articulated fitting, and capable of having its inclination adjusted, in upright use position, all in accordance with the present invention.
Figure 2:
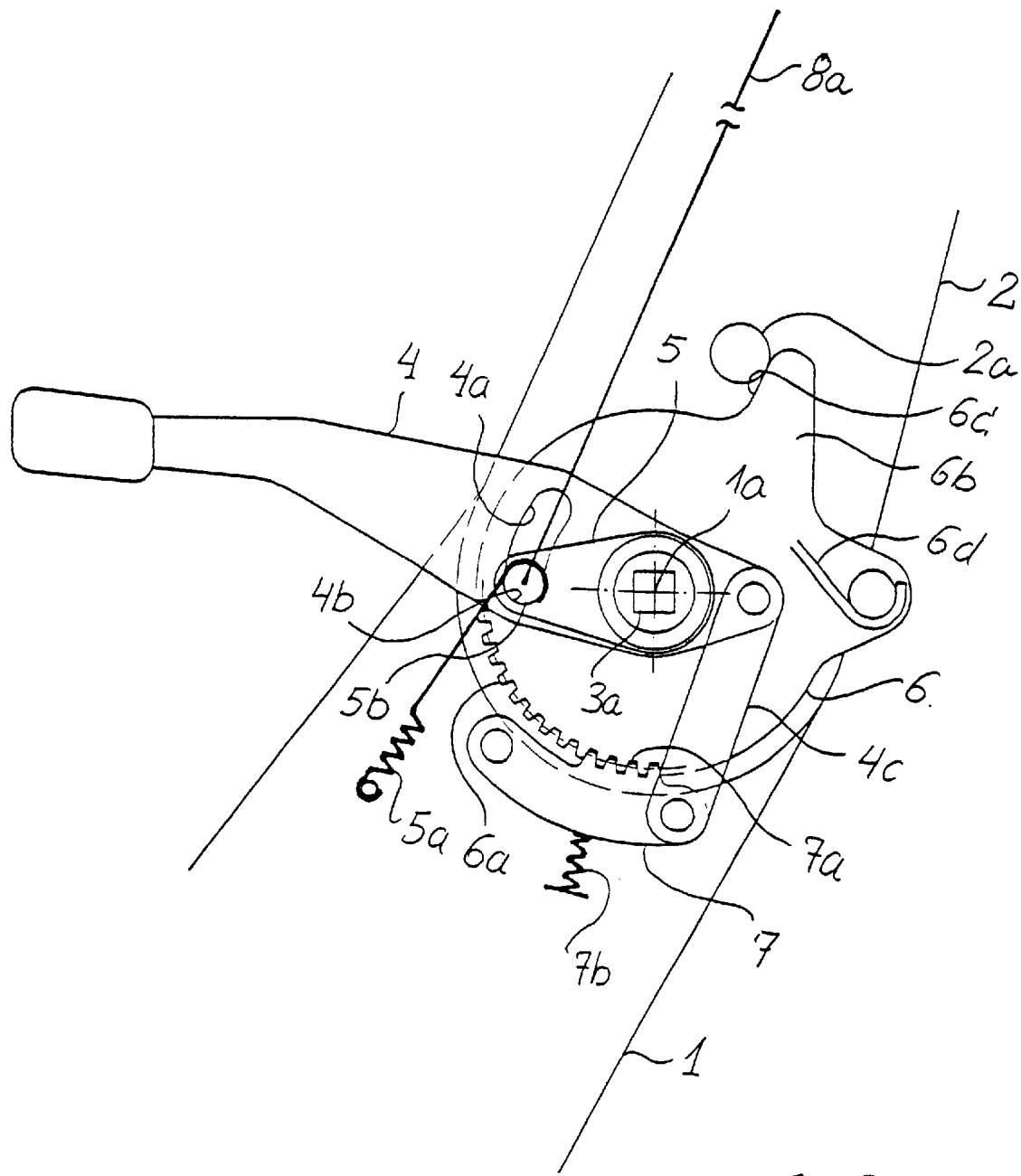
FIG. 2 is an enlarged view of the section of an automobile seat including an articulated fitting as in FIG. 1, according to the present invention.

A second actuation element 5 formed as an actuation lever is attached to the actuation shaft 3a so that it may not rotate, and is prevented from axial dislocation by means of a safety disk 3b. The second actuation element 5 acts exclusively on the inclination adjustment fitting 3. At its free end, it includes a driver 5b that extends through a slot 4a in the first actuation element 4. In the initial position shown in FIG. 2, the driver 5b rests against a strike surface 4b of the slot 4a. It is held against the strike surface 4b by a spring 5a. The spring 5a holds the second actuation element 5 in its locked position of the inclination adjustment fitting 3 until it is displaced by a remote-control lever 8 mounted on top of the seat back 2 used to tilt the seat back forward via a cable 8a, or by the first actuation element 4 used to adjust the inclination of the seat back 2.

The ratcheting block 7 includes engaging teeth 7a on the side toward the pivot axis 1a that engage with engaging teeth 6a around the exterior circumference of a ratcheting disk 6. The ratcheting block 7 is pre-tensioned in the engagement direction with the engaging teeth 6a via a spring 7b. The ratcheting disk 6 is mounted to the seat back 2 so that it is free to swivel about the pivot axis 1a. The ratcheting disk 6 includes a strike boss 6b that is held via a spring 6d in contact with a strike surface 6c against an opposing element 2a formed as a bar. The spring 6d rests against the seat back 2 in a manner not shown. The opposing element 2a is firmly fixed to the seat back 2.

Figure 3:
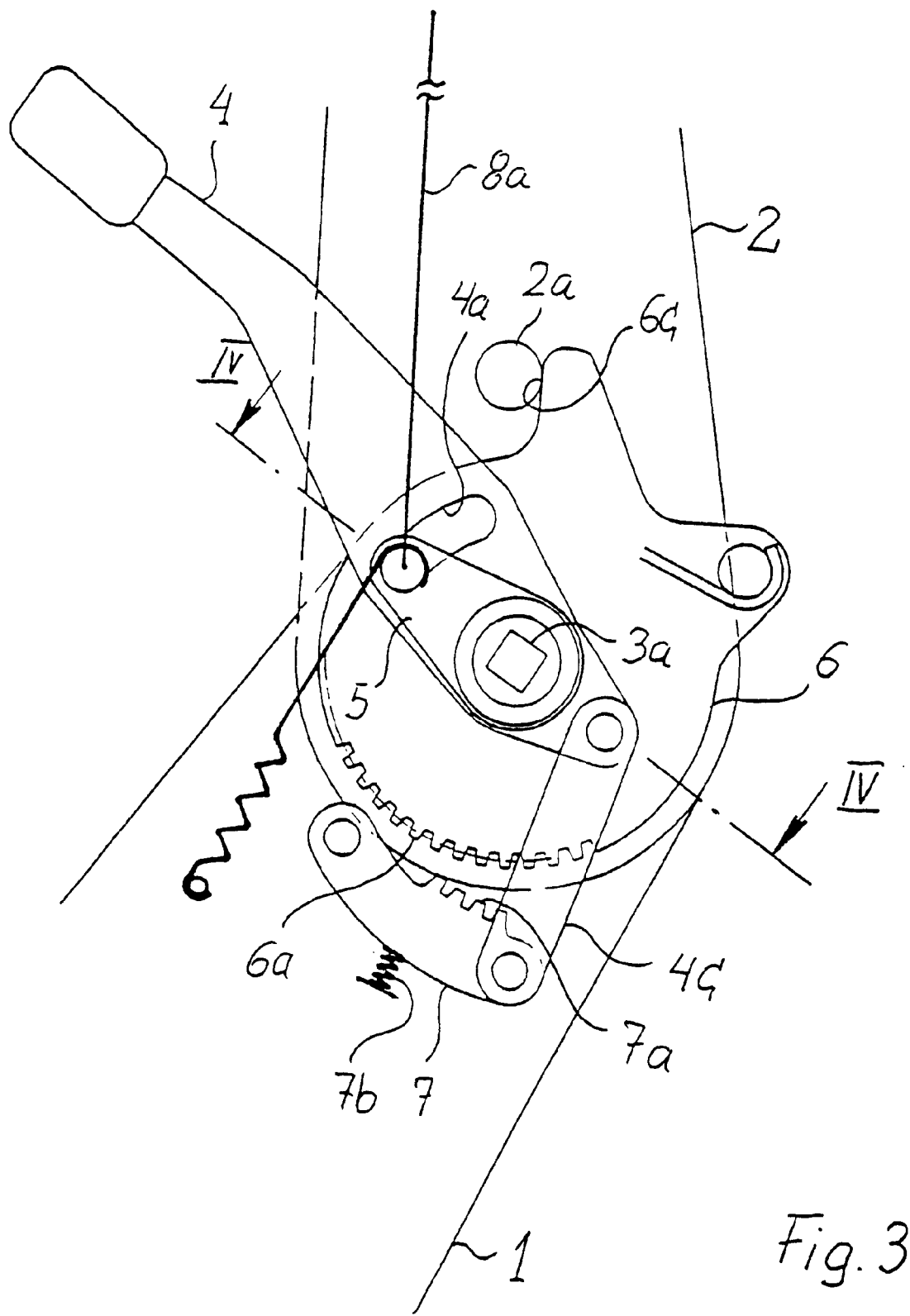
FIG. 3 is the view as in FIG. 2 during inclination adjustment of the seat back.

To adjust the inclination of the seat back 2, the first actuation element 4 (as FIG. 3 shows) is pivoted clockwise. The engaging teeth 7a are thereby raised from the ratcheting engaging teeth 6a. Simultaneously, the second actuation element 5 is pivoted in the same direction via the driver 5b, whereby the inclination adjustment fitting 3 is released. The ratcheting disk 6 is free to rotate, and is held in contact with the opposing element 2a via the spring 6d. The seat back 2 is then moved into the desired inclined position by the user in the normal fashion against the force of a spring (not shown) that pre-tensions the seat back toward the direction of vehicle travel.

When the actuation element 4 is released, the spring 7b pivots the ratcheting block 7 into the engaging teeth 6a, whereby the first actuation element 4 returns to its initial position. The second actuation element 5, which is held via the spring 5a against the strike surface 4b, follows the first actuation element 4, so that the inclination adjustment fitting 3 locks the seat back 2 into the new inclined position. The ratcheting block 7 thereby engages with a new section of the ratcheting engaging teeth 6a because of the inclination of the seat back 2 with respect to the opposing element 2[a].

Figure 5:
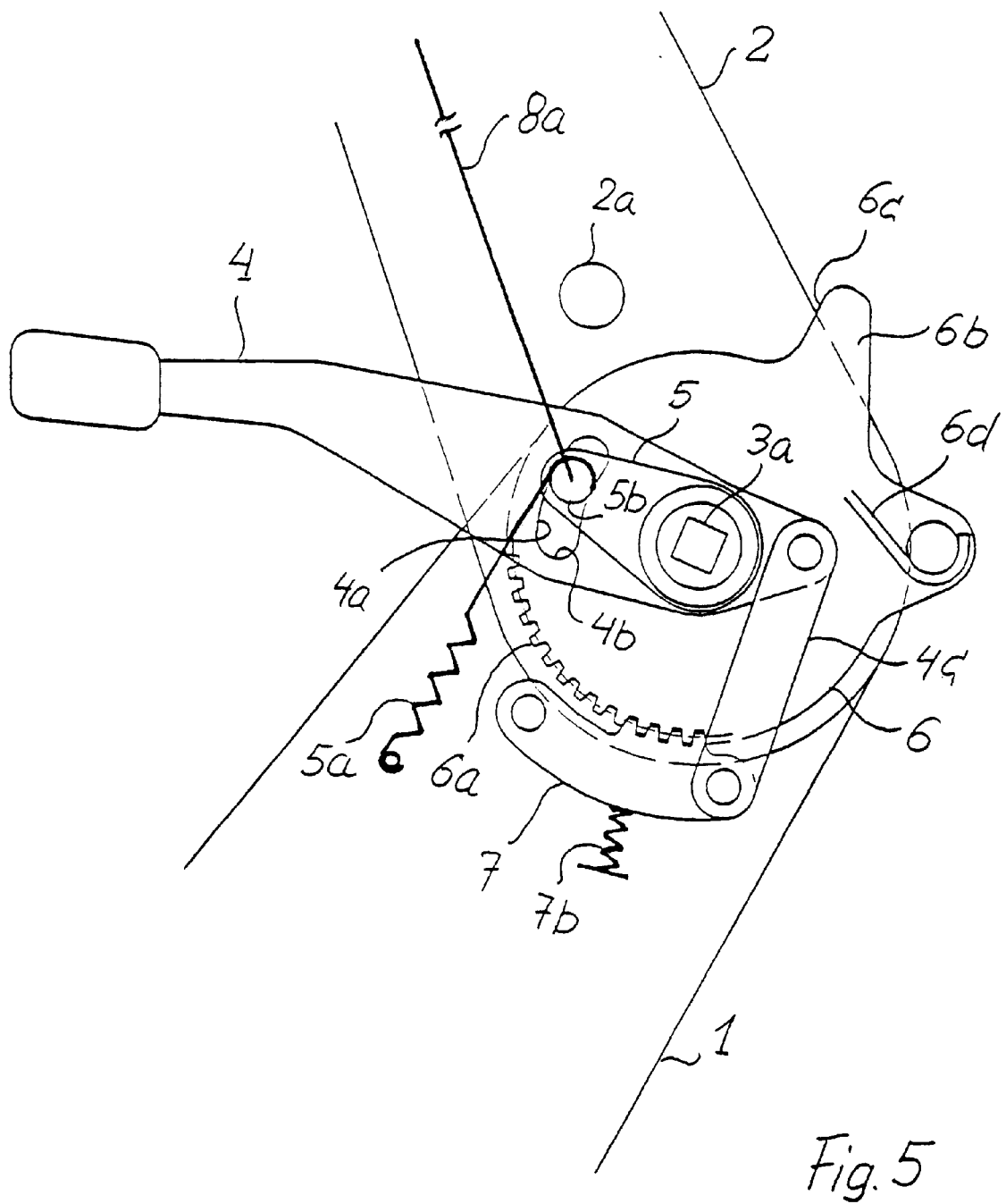
FIG. 5 is the view in FIG. 2 during tilt movement of the seat back.

To tilt the seat back 2 forward, only the second actuation element 5 is swiveled by the remote-control lever 8 via the cable 8a. The actuation element 5 releases the inclination adjustment fitting 3. Since the driver 5b is displaced thereby within the slot 4a, the first actuation element 4 remains in its initial position, so that the ratcheting disk 6 is fixed against the seat body 1 via the ratcheting block 7. When the seat back 2 is tilted forward, the opposing element 2a is separated from its strike surface 6c, as FIG. 5 shows. The seat back 2 thus may be tilted back only until the opposing element 2[a] rests against the strike surface 6c. This position corresponds to the previously set inclination. The inclination of the seat back 2 in its use position thus is not changed by tilting it forward.

Modifications and substitutions by one of ordinary skill in the art are considered to be within the scope of the present invention, which is not to be limited except by the following claims.

The invention claimed is:

1. An inclination adjustment fitting for a seat having a seat body and a seat back, said inclination adjustment fitting having a first position whereby a user may adjust the inclination of said seat back about a pivot axis relative to said seat body, and a second position wherein said user may tilt said seat forward into a release position, said inclination adjustment fitting comprising:

a first actuation element mounted free to rotate concentrically with an actuation shaft, said first actuation element including a slot having a strike surface;

a second actuation element disposed about said actuation shaft such that said second actuation element may not rotate, said second actuation element including a driver that extends through said slot in said first actuation element, said driver being biased against said strike surface on said slot when said seat is in said first position;

an opposing element secured to said seat back;

a ratcheting disk mounted to said seat back such that said ratcheting disk is free to rotate about said pivot axis, said ratcheting disk having a plurality of engaging teeth and a strike surface that is biased against said opposing element when said seat is in said first position; and a ratcheting block mounted to said seat body and in communication with said first actuation element via a shackle, said ratcheting block having an engaging surface wherein said engaging surface of said ratcheting block is biased against said plurality of engaging teeth on said ratcheting disk when said seat is in said first position.

2. The inclination adjustment fitting as in claim 1, further including a remote-control lever disposed proximate a top of said seat back, said remote-control lever in communication with wherein said user pivots said remote-control lever which causes said second actuation element to.

3. The inclination adjustment fitting as in claim 1, wherein the ratcheting block is a ratcheting lever firmly fixed to the seat body that may be brought into engagement with engaging teeth arranged about a circumference of the ratcheting disk.

4. The inclination adjustment fitting as in claim 1, wherein the engaging surface of said ratcheting block is pretensioned against said engaging teeth of said ratcheting disk bu a spring.

5. The inclination adjustment fitting as in claim 1, wherein the second actuation element is an actuation lever fixed on the actuation shaft of the inclination adjustment fitting.

6. The inclination adjustment fitting as in claim 1, wherein the second actuation element is pre-tensioned via a spring to hold said driver against said strike surface of the first actuation element.

7. The inclination adjustment fitting as in claim 1, wherein the strike surface of said ratcheting disk is formed on a strike boss on the circumference of the ratcheting disk, and the opposing element is formed by a bar extending parallel to the pivot axis.

* * * * *